United States Patent
Suzuki

(10) Patent No.: US 8,180,529 B2
(45) Date of Patent: May 15, 2012

(54) ELECTRIC POWER STEERING APPARATUS

(75) Inventor: Hiroshi Suzuki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 1016 days.

(21) Appl. No.: 12/132,177

(22) Filed: Jun. 3, 2008

(65) Prior Publication Data

US 2008/0296085 A1 Dec. 4, 2008

(30) Foreign Application Priority Data

Jun. 4, 2007 (JP) ................................. 2007-148405

(51) Int. Cl.
*B62D 5/04* (2006.01)

(52) U.S. Cl. .............. 701/41; 701/42; 701/43; 180/444; 180/446; 318/287; 318/432

(58) Field of Classification Search .............. 701/41–43; 180/443, 446, 444; 318/287, 432
See application file for complete search history.

(56) References Cited

U.S. PATENT DOCUMENTS

| | | | | |
|---|---|---|---|---|
| 4,162,708 A | * | 7/1979 | Johnson | 172/4.5 |
| 5,631,529 A | * | 5/1997 | Shimizu et al. | 318/432 |
| 5,809,438 A | * | 9/1998 | Noro et al. | 701/41 |
| 6,046,560 A | * | 4/2000 | Lu et al. | 318/432 |
| 6,107,767 A | * | 8/2000 | Lu et al. | 318/561 |
| 6,250,419 B1 | * | 6/2001 | Chabaan et al. | 180/443 |
| 6,293,366 B1 | * | 9/2001 | Chabaan et al. | 180/446 |
| 6,422,335 B1 | * | 7/2002 | Miller | 180/446 |
| 6,425,454 B1 | * | 7/2002 | Chabaan et al. | 180/443 |
| 6,831,477 B2 | * | 12/2004 | Fukusumi et al. | 324/765.01 |
| 6,838,844 B2 | * | 1/2005 | Shimizu et al. | 318/287 |
| 6,883,637 B2 | * | 4/2005 | Nishizaki et al. | 180/446 |
| 6,896,094 B2 | * | 5/2005 | Chabaan | 180/446 |
| 7,337,873 B2 | * | 3/2008 | Aizawa et al. | 180/446 |
| 7,456,603 B2 | * | 11/2008 | Kanekawa et al. | 318/807 |
| 7,469,768 B2 | * | 12/2008 | Chino et al. | 180/405 |
| 7,530,423 B2 | * | 5/2009 | Limpibunterng et al. | 180/446 |
| 7,610,133 B2 | * | 10/2009 | Nagase et al. | 701/41 |
| 7,684,912 B2 | * | 3/2010 | Nishimura | 701/41 |

(Continued)

FOREIGN PATENT DOCUMENTS

EP 0 943 527 A2 9/1999

(Continued)

OTHER PUBLICATIONS

Notice of Opposition issued May 17, 2011 in European Patent Application No. 08157489.9—1523/2000389.

(Continued)

*Primary Examiner* — Thomas G. Black
*Assistant Examiner* — Wae Louie
(74) *Attorney, Agent, or Firm* — Oblon, Spivak, McClelland, Maier & Neustadt, L.L.P.

(57) ABSTRACT

A microcomputer 17 (signal generating section 24) includes an attenuating section 31, which attenuates a specific frequency component included in an input signal. The attenuating section 31 receives a d-axis current value Id and a q-axis current value Iq, which are actual currents supplied to a motor 12. The attenuating section 31 receives a rotational angular velocity ωe of the motor 12. The attenuating section 31 changes the specific frequency component to be attenuated based on the input rotational angular velocity ωe. Then, the microcomputer 17 executes current feedback control for feeding power to the motor 12 based on the d-axis current value Id' and the q-axis current value Iq' that have been attenuated.

5 Claims, 3 Drawing Sheets

U.S. PATENT DOCUMENTS

| | | | |
|---|---|---|---|
| 7,826,950 B2 * | 11/2010 | Tamaizumi et al. | 701/42 |
| 7,860,624 B2 * | 12/2010 | Kubota et al. | 701/41 |
| 7,873,453 B2 * | 1/2011 | Kobayashi et al. | 701/41 |
| 7,902,780 B2 * | 3/2011 | Okita et al. | 318/432 |
| 7,909,131 B2 * | 3/2011 | Nishimura | 180/446 |
| 7,952,308 B2 * | 5/2011 | Schulz et al. | 318/400.23 |
| 7,983,816 B2 * | 7/2011 | Kobayashi et al. | 701/41 |
| 2003/0179004 A1 * | 9/2003 | Fukusumi et al. | 324/713 |
| 2007/0198153 A1 * | 8/2007 | Oya et al. | 701/41 |
| 2007/0205041 A1 * | 9/2007 | Nishizaki et al. | 180/446 |
| 2008/0296085 A1 * | 12/2008 | Suzuki | 180/444 |

FOREIGN PATENT DOCUMENTS

| | | |
|---|---|---|
| EP | 1 470 988 A1 | 10/2004 |
| EP | 1 767 436 A1 | 3/2007 |
| EP | 1 777 806 A2 | 4/2007 |
| JP | 11-313497 | 11/1999 |
| JP | 2002-44925 | 2/2002 |
| JP | 2002-136043 | 5/2002 |
| JP | 2003-333889 | 11/2003 |
| JP | 2005-119417 | 5/2005 |
| JP | 2006-62390 | 3/2006 |
| WO | WO 02/100704 A2 | 12/2002 |

OTHER PUBLICATIONS

Office Action issued Jan. 4, 2012 in Japan Application No. 2007-148405.

* cited by examiner

ELECTRIC POWER STEERING APPARATUS

BACKGROUND OF THE INVENTION

The present invention relates to an electric power steering apparatus.

Conventional power steering apparatuses for a vehicle include an electric power steering apparatus (EPS) provided with a motor as a driving source. The EPS has a feature that a flexibility of the layout is high, and an energy consumption is small, in comparison with a hydraulic power steering apparatus. Accordingly, in recent years, the introduction of the EPS has been considered for many kinds of vehicles ranging from compact vehicles to large-sized vehicles.

In the vehicle steering apparatus, one of the most important issues for achieving excellent steering feel is to suppress vibration transmitted through a steering wheel and noise generated by the vibration. In particular, in the EPS that includes a motor as a driving source, torque ripples of an order component (X-th order component) proportional to an integral multiple of a motor rotational angle (mechanical angle) are generated due to electrical and mechanical factors. The torque ripples of such an order component resonate with the mechanical structure of the EPS and the vehicle, so that the vibration and noise generated by the torque ripples of the order component are further increased. Therefore, as disclosed in Japanese Laid-Open Patent Publication Nos. 2002-136043 and 2002-44925, in order to suppress vibration and noise generated by the motor in the EPS, various countermeasures are conventionally taken in accordance with the cause of the vibration and noise.

However, depending on the cause, structural measures might not sufficiently suppress the vibration and noise due to, for example, precision limits. Therefore, Japanese Laid-Open Patent Publication No. 11-313497 discloses an EPS that feeds a power to a motor by executing current feedback control. The EPS is provided with a notch filter, which removes (attenuates) a specific frequency component included in an actual current value supplied to the motor or a control signal generated based on the actual current value. The publication proposes a structure for removing a resonance frequency component that causes the problem using the notch filter to suppress amplification of vibration and noise due to the resonance.

However, some of the torque ripples of the above-mentioned order component have significantly great excitation energy, and torque ripples of such an order component might cause vibration and noise regardless of resonance. In FIG. 4, the darker the shaded part is, the higher the vibration level becomes, and the areas above dashed lines correspond to the torque ripples of order components. Therefore, in the structure for removing the specific resonance frequency component as disclosed in the publication No. 11-313497, the torque ripples of the order components with high excitation energy are not effectively reduced. Thus, there is yet room for improvements in this point.

Accordingly, it is an objective of the present invention to provide an electric power steering apparatus that accurately reduces torque ripples of order components and effectively suppress generation of vibration and noise.

To achieve the above objective, the present invention provides an electric power steering apparatus including a motor as a power source and a steering force assist device, which applies an assist force for assisting a steering operation of a steering wheel in a vehicle steering system to the steering system. The apparatus includes a control device and an attenuating section. The control device controls actuation of the steering force assist device by feeding a power to the motor by executing current feedback control. The attenuating section is provided in the control device and attenuates a specific frequency component included in an actual current value supplied to the motor or a control signal generated by executing the current feedback control. The attenuating section changes the specific frequency component to be attenuated in accordance with the rotational angular velocity of the motor.

The above-mentioned configuration reduces, in a wide rotational angular velocity range, torque ripples of order components, the frequency of which shifts toward a higher frequency in proportion to the increase in the rotational angular velocity. As a result, generation of vibration and noise is effectively suppressed.

DETAILED DESCRIPTION OF THE PREFERRED EMBODIMENTS

An electric power steering apparatus (EPS) 1 according to one embodiment of the present invention will now be described with reference to drawings.

Figure 1:
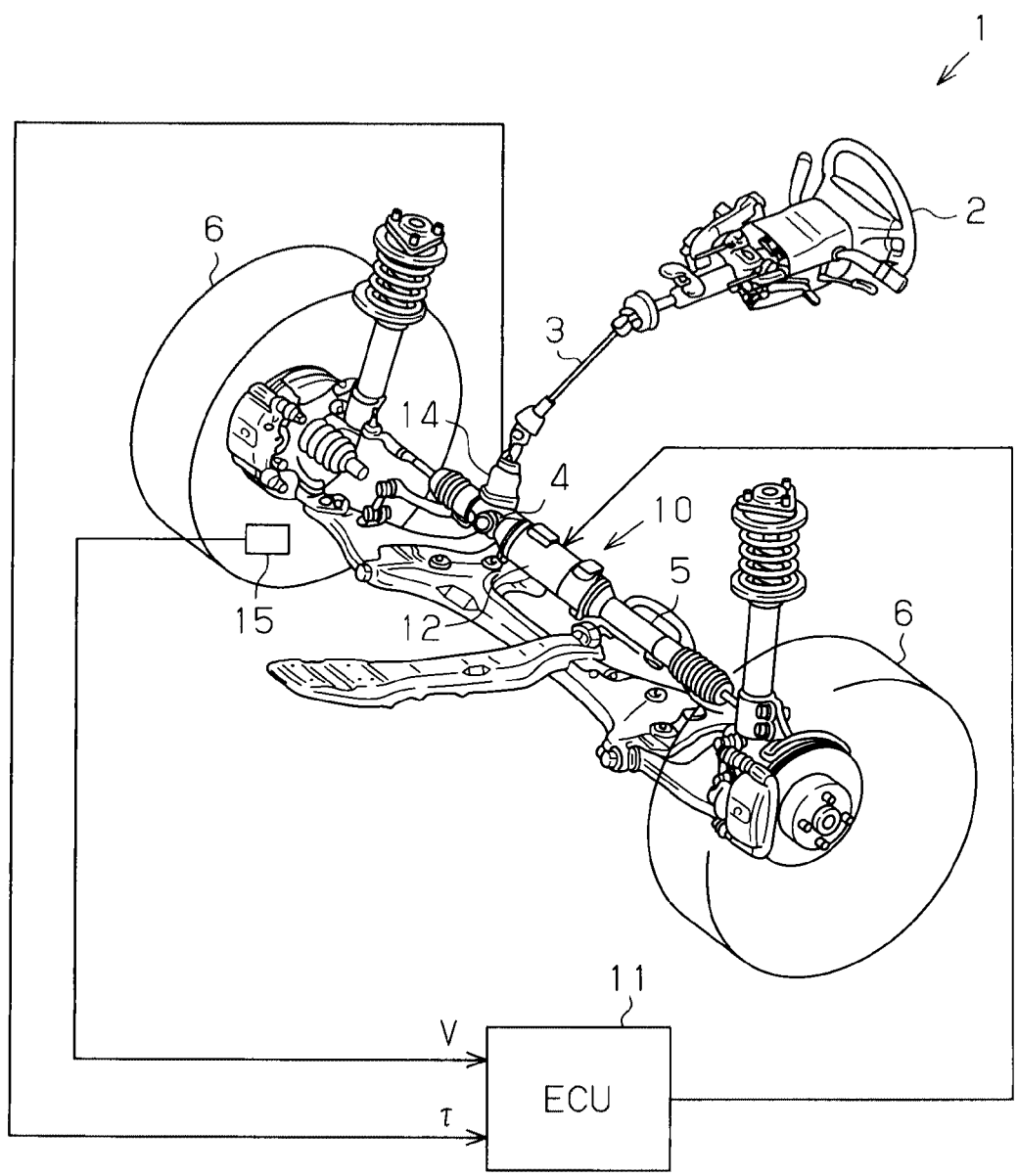
FIG. 1 is a diagrammatic view of an electric power steering apparatus (EPS)

FIG. 1 is a schematic diagram of an EPS 1 according to the preferred embodiment. As shown in FIG. 1, a steering wheel 2 is fixed to a steering shaft 3, and the steering shaft 3 is coupled to a rack 5 via a rack-and-pinion mechanism 4. Rotation of the steering shaft 3 accompanying a steering operation is converted into a reciprocating linear motion of the rack 5 by the rack-and-pinion mechanism 4. The reciprocating linear motion of the rack 5 changes the steering angle of steered wheels 6.

Furthermore, the EPS 1 includes an EPS actuator 10 serving as a steering force assist device, which applies an assist force for assisting steering operation to a steering system, and an ECU 11 serving as control means for controlling actuation of the EPS actuator 10.

The EPS actuator 10 of the preferred embodiment is a rack type EPS actuator in which a motor 12 serving as a driving source is arranged coaxially with the rack 5. An assist torque generated by the motor 12 is transmitted to the rack 5 via a ball screw mechanism (not shown). The motor 12 of the preferred embodiment is a brushless motor and is rotated by receiving a three-phase (U, V, W) power from the ECU 11. The ECU 11 serving as a motor control device controls the assist force applied to the steering system by controlling the assist torque generated by the motor 12.

In the preferred embodiment, a torque sensor 14 and a vehicle speed sensor 15 are connected to the ECU 11. The ECU 11 controls actuation of the EPS actuator 10, that is, performs power assist control based on a steering torque $\tau$ and a vehicle speed V detected by the torque sensor 14 and the vehicle speed sensor 15, respectively.

The electrical configuration of the EPS according to the preferred embodiment will now be described.

Figure 2:
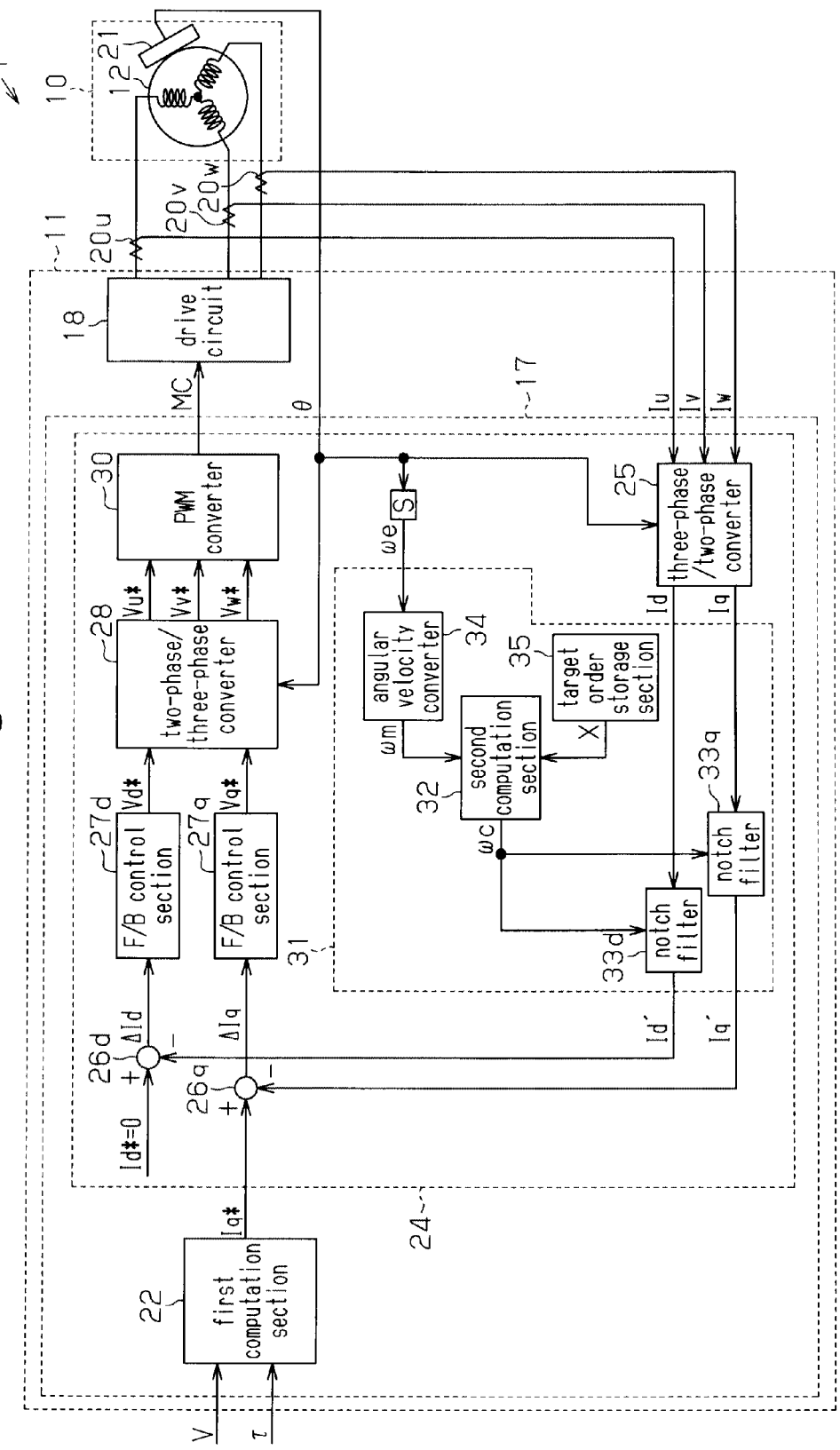
FIG. 2 is a block diagram showing an electrical structure of the EPS.

FIG. 2 is a control block diagram of the EPS according to the preferred embodiment. As shown in FIG. 2, the ECU 11 includes a microcomputer 17 serving as motor control signal output means for outputting a motor control signal MC and a drive circuit 18, which feeds a three-phase power to the motor 12 based on the motor control signal MC output from the microcomputer 17.

The drive circuit 18 is a known PWM inverter, in which a pair of switching elements connected in series form a base unit, or an arm, and three arms each corresponding to one of the phases are connected in parallel. The motor control signal MC output from the microcomputer 17 specifies an ON-duty ratio of each switching element configuring the drive circuit 18. The motor control signal MC is applied to a gate terminal of each switching element so that each switching element is switched between ON-duty and OFF-duty in response to the motor control signal MC. Accordingly, a direct-current voltage of a vehicle power source (not shown) is converted to a three-phase (U, V, W) power and is supplied to the motor 12.

Current sensors 20u, 20v, 20w for detecting phase current values Iu, Iv, Iw supplied to the motor 12 and a rotational angle sensor 21 for detecting a rotational angle (electrical angle) θ of the motor 12 are connected to the ECU 11. The microcomputer 17 outputs the motor control signal MC to the drive circuit 18 based on the phase current values Iu, Iv, Iw and the rotational angle θ of the motor 12 detected based on output signals from the sensors, the steering torque τ, and the vehicle speed V.

The microcomputer 17 includes a first computation section 22, which computes a current command value as a control target amount of the assist force applied to the steering system, and a signal generating section 24 serving as signal generating means, which generates the motor control signal MC based on the current command value computed by the first computation section 22.

The first computation section 22 receives the steering torque τ and the vehicle speed V detected by the torque sensor 14 and the vehicle speed sensor 15. Based on the steering torque τ and the vehicle speed V, the first computation section 22 computes a q-axis current command value of a d/q coordinate system as the current command value corresponding to the control target amount of the assist force. More specifically, as the steering torque τ becomes greater and the vehicle speed V becomes smaller, the first computation section 22 computes a q-axis current command value Iq* corresponding to a greater target assist force.

The signal generating section 24 receives, along with the q-axis current command value Iq* computed by the first computation section 22, actual current values, which are the phase current values Iu, Iv, Iw detected by the current sensors 20u, 20v, 20w, and the rotational angle θ detected by the rotational angle sensor 21. The signal generating section 24 executes current feedback control of the d/q coordinate system based on the phase current values Iu, Iv, Iw and the rotational angle θ (electrical angle), thereby generating the motor control signal MC.

That is, the phase current values Iu, Iv, Iw input to the signal generating section 24 are input to a three-phase/two-phase converter 25 together with the rotational angle θ, and are converted to a d-axis current value Id and a q-axis current value Iq of the d/q coordinate system by the three-phase/two-phase converter 25. Also, the q-axis current command value Iq* input to the signal generating section 24 is input to a subtractor 26q together with the q-axis current value Iq (that is, a q-axis current value Iq' that has passed through an attenuating section 31 of a specific frequency component described below). The d-axis current value Id (that is, a d-axis current value Id' that has passed through the attenuating section 31 of a specific frequency component) is input to a subtractor 26d together with a d-axis current command value Id* (Id*=0). Then, a d-axis current difference ΔId and a q-axis current difference ΔIq computed by the subtractors 26d, 26q are input to F/B control sections 27d, 27q, respectively.

The F/B control sections 27d, 27q compute a d-axis voltage command value Vd* and a q-axis voltage command value Vq* by multiplying the input d-axis current difference ΔId and q-axis current difference ΔIq by a predetermined F/B gain (PI gain). The d-axis voltage command value Vd* and the q-axis voltage command value Vq* computed by the F/B control sections 27d, 27q are input to a two-phase/three-phase converter 28 together with the rotational angle θ. Then, the d-axis voltage command value Vd* and the q-axis voltage command value Vq* are converted to three-phase voltage command values Vu*, Vv*, Vw* by the two-phase/three-phase converter 28.

The voltage command values Vu*, Vv*, Vw* computed by the two-phase/three-phase converter 28 are input to a PWM converter 30. The PWM converter 30 generates duty command values corresponding to the voltage command values Vu*, Vv*, Vw*. The signal generating section 24 then generates the motor control signal MC having the ON-duty ratio represented by the duty command values. The microcomputer 17 controls actuation of the drive circuit 18, that is, supply of power to the motor 12 by outputting the motor control signal MC to the gate terminals of the switching elements configuring the drive circuit 18.

(Torque Ripple Reduction Control)

A torque ripple reduction control of the preferred embodiment will now be described.

As shown in FIG. 2, the microcomputer 17 (signal generating section 24) includes the attenuating section 31, which serves as attenuating means that attenuates a specific frequency component included in the input signal.

The attenuating section 31 receives the d-axis current value Id and the q-axis current value Iq output from the three-phase/two-phase converter 25. The subtractors 26d, 26q receive the d-axis current value Id' and the q-axis current value Iq' from which vibration components have been removed by an attenuating process of the attenuating section 31. Then, the microcomputer 17 executes the current feedback control on the basis of the d-axis current value Id' and the q-axis current value Iq' that have been attenuated and generates the motor control signal MC. This reduces torque ripple and suppresses generation of vibration and noise due to the torque ripple.

The attenuating section 31 of the preferred embodiment receives the rotational angular velocity (electrical angular velocity) ωe of the motor 12 together with the d-axis current value Id and the q-axis current value Iq. The attenuating section 31 changes the specific frequency component that becomes the target of attenuation (see FIG. 3) based on the rotational angular velocity ωe. In the preferred embodiment, the current feedback control is executed based on the d-axis current value Id' and the q-axis current value Iq' that have been attenuated to precisely reduce the torque ripple of an order component (X-th order component) proportional to an integral multiple of the motor rotational angle (mechanical angle) that causes vibration and noise.

Figure 4:
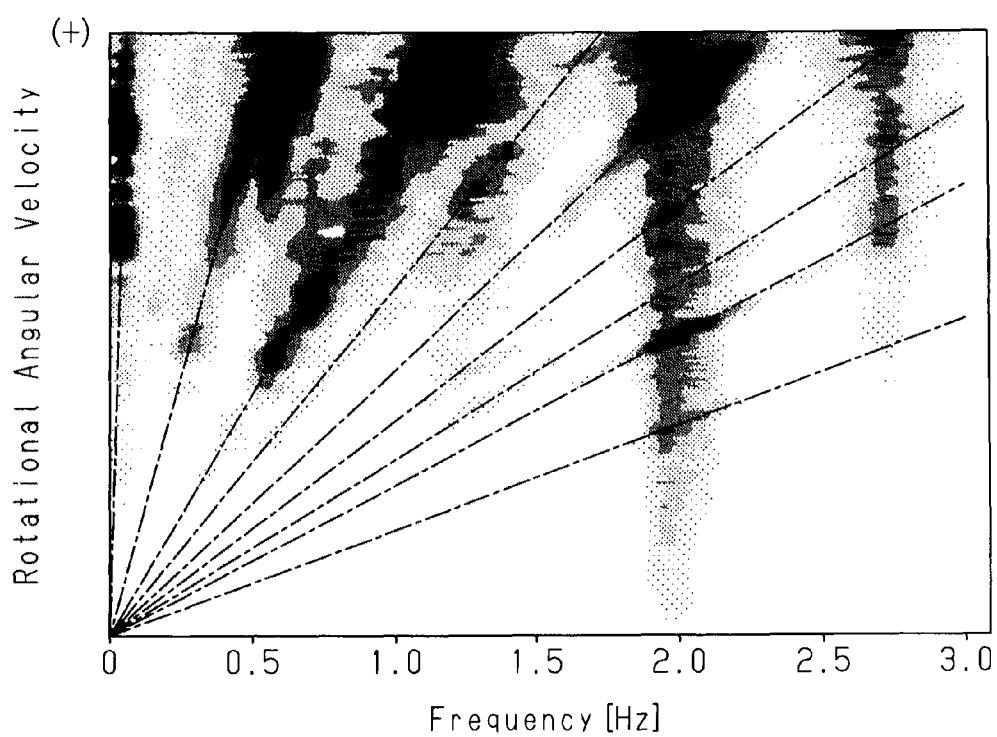
FIG. 4 is an explanatory diagram showing one example of a tracking analysis.

That is, the frequency of the torque ripple of such an order component shifts toward a higher frequency in proportion to the increase in the rotational angular velocity (see FIG. 4). Therefore, the structure for removing the specific resonance frequency component disclosed in the publication No. 11-313497 cannot cope with the torque ripple of the order component having great excitation energy that generates vibration and noise regardless of resonance.

Figure 3:
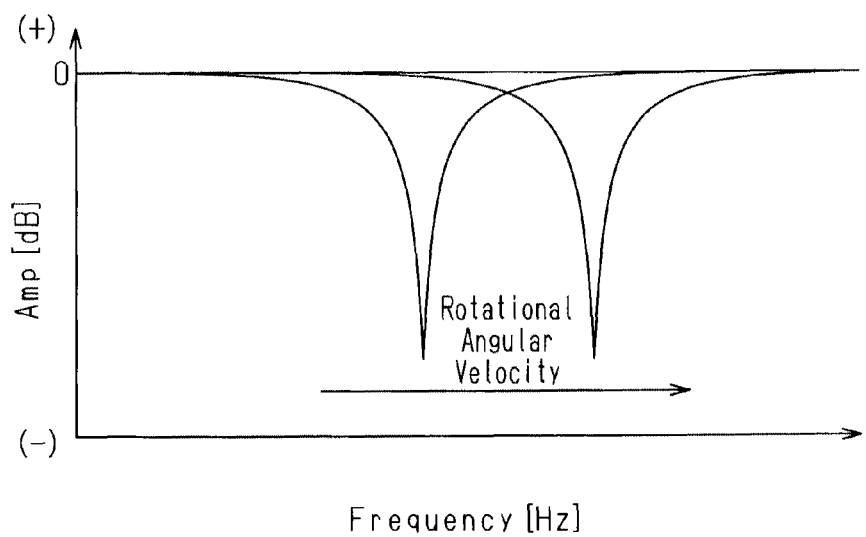
FIG. 3 is an explanatory diagram showing the manner of changing a frequency component to be attenuated in accordance with the rotational angular velocity.

Taking this point into consideration, in the preferred embodiment, the attenuating section 31 changes the specific frequency component in accordance with the frequency variation of the torque ripple of the target order component in accordance with the rotational angular velocity (see FIG. 3). This accurately reduces the torque ripple of the order component, and effectively suppresses vibration and noise.

More specifically, the attenuating section 31 of the preferred embodiment includes a second computation section 32, which computes an attenuation angular frequency ωc that changes in accordance with the frequency variation of the torque ripple of the target order component in accordance with the rotational angular velocity, and notch filters 33d, 33q, which have an attenuation property for the frequency component specified by the computed frequency ωc. Then, the d-axis current value Id' and the q-axis current value Iq' that have passed through the corresponding notch filters 33d, 33q are output to the subtractors 26d, 26q.

The rotational angular velocity ωe as an electrical angular velocity input to the attenuating section 31 is converted, by the angular velocity converter 34, to a rotational angular velocity (mechanical angular velocity ωm) as a mechanical angle, and then input to the second computation section 32. The mechanical angular velocity ωm is obtained by dividing the rotational angular velocity ωe as the electrical angle by the number of pole pairs (p) of the motor (ωm=ωe/p). Also, the attenuating section 31 is provided with a storage section 35 for storing the order of an order component that will be a torque ripple reduction target. The second computation section 32 receives, together with the mechanical angular velocity ωm, an order X that is stored in the storage section 35 or that is preliminary set as a target component. The second computation section 32 then computes, based on the input mechanical angular velocity ωm and the order X, the attenuation angular frequency ωc represented by the following equation (1).

$$\omega_c = 2\pi f_c = X \cdot \omega_m \quad (1)$$

In the equation (1), fc is a cutoff frequency, X is the order, ωm is the mechanical angular velocity.

Also, the d-axis current value Id and the q-axis current value Iq input to the attenuating section 31 are input to the corresponding notch filters 33d, 33q together with the attenuation angular frequency ωc computed by the second computation section 32.

The notch filters 33d, 33q have the attenuation property represented by a transfer function of the following equation (2).

$$F(s) = \frac{s^2 + 2\zeta_1 \omega_c s + \omega_c^2}{s^2 + 2\zeta_2 \omega_c s + \omega_c^2} \quad (2)$$

In the equation (2), s is a Laplace operator and $\zeta_1$, $\zeta_2$ are parameters, which determine the depth and width of notches of the corresponding notch filters 33d, 33q and satisfy the relationship of $\zeta_1 > \zeta_2$. ωc is an attenuation angular frequency.

The attenuating section 31 then outputs the d-axis current value Id' and the q-axis current value Iq' that have been attenuated by the notch filters 33d, 33q to the subtractors 26d, 26q.

That is, the attenuation angular frequency ωc computed in the second computation section 32 changes in accordance with the increase in the input mechanical angular velocity ωm. Accordingly, the frequency component attenuated by the notch filters 33d, 33q specified by the attenuation angular frequency ωc also shifts toward a higher frequency in proportion to the frequency change of the target order component in accordance with the rotational angular velocity. Therefore, the torque ripple of the order component is accurately reduced, thereby effectively suppressing vibration and noise.

The preferred embodiment has the following operations and advantages.

(1) The microcomputer 17 (signal generating section 24) includes the attenuating section 31, which attenuates the specific frequency component included in the input signal. The attenuating section 31 receives the d-axis current value Id and the q-axis current value Iq, which are actual currents supplied to the motor 12. The attenuating section 31 also receives the rotational angular velocity ωe of the motor 12. Based on the rotational angular velocity ωe, the attenuating section 31 changes the specific frequency component to be attenuated. The microcomputer 17 then executes the current feedback control for feeding a power to the motor 12 based on the d-axis current value Id' and the q-axis current value Iq' that have been attenuated.

The above-mentioned configuration reduces, in a wide rotational angular velocity range, the torque ripple of the order component, the frequency of which shifts toward a higher frequency in proportion to the increase in the rotational angular velocity. As a result, generation of vibration and noise is effectively suppressed.

(2) The attenuating section 31 includes the second computation section 32, which computes the attenuation angular frequency ωc that changes in accordance with the frequency variation of the torque ripple of the target order component in accordance with the rotational angular velocity, and the notch filters 33d, 33q, which have the attenuation property for the frequency component specified by the computed attenuation angular frequency ωc.

With this configuration, the frequency component attenuated by the notch filters 33d, 33q shifts toward a higher frequency in proportion to the frequency change of the target order component in accordance with the rotational angular velocity. Accordingly, the torque ripple of the target order component is further precisely reduced, and as a result, generation of vibration and noise is more effectively suppressed.

The preferred embodiment may be modified as follows.

In the preferred embodiment, the attenuating section 31 attenuates the d-axis current value Id and the q-axis current value Iq, which are the actual currents. However, instead of the actual currents, the control signal generated by the current feedback control may be attenuated. With this configuration also, the same advantages as the preferred embodiment are obtained. In this case, "control signal generated by the current feedback control" includes the command value of each dimension (d/q-axes coordinate system and three-phase alternate coordinate system) after the current feedback control.

Also, only the q-axis current value Iq (or the control signal equivalent to the q-axis current value) may be attenuated. That is, the frequency component causing the torque ripple is most significant in the q-axis current value (or the control signal equivalent to the q-axis current value). Therefore, by attenuating at least the q-axis current value (or the control signal equivalent to the q-axis current value), the torque ripple is reduced as in the preferred embodiment.

Furthermore, the present invention may be applied to a configuration in which the phase current values Iu, Iv, Iw before the d/q conversion are attenuated, and may be further applied to a configuration in which a power is supplied by executing a phase current feedback control.

The attenuating section 31 of the preferred embodiment has notch filters 33*d*, 33*q* each corresponding to one of the d-axis current value Id and the q-axis current value Iq as shown in FIG. 2. However, for example, in a case where a number of order components are to be attenuated, notch filters each corresponding to one of the order components may be connected in series. Also, a notch filter for attenuating the resonance frequency component may be combined.

The invention claimed is:

1. An electric power steering apparatus including a motor as a driving source and a steering force assist device, which applies an assist force for assisting a steering operation of a steering wheel in a vehicle steering system to the steering system, the apparatus comprising:
    a control device for controlling actuation of the steering force assist device by feeding power to the motor by executing current feedback control; and
    an attenuating section provided in the control device, the attenuating section attenuates a specific frequency component included in an actual current value supplied to the motor or a control signal generated by executing the current feedback control,
    wherein the attenuating section changes the specific frequency component to be attenuated in accordance with the rotational angular velocity of the motor.

2. The electric power steering apparatus according to claim 1,
    wherein the attenuating section includes a computation section, which computes an attenuation angular frequency based on an order of the specific frequency component and the rotational angular velocity of the motor, and a notch filter having an attenuation property for the frequency component specified by the computed attenuation angular frequency.

3. The electric power steering apparatus according to claim 2,
    wherein the control device feeds power to the motor by executing current feedback control in a d/q coordinate system, and
    wherein the attenuating section at least attenuates the specific frequency component included in a q-axis current value or the control signal equivalent to the q-axis current value.

4. The electric power steering apparatus according to claim 1,
    wherein the control device feeds power to the motor by executing current feedback control in a d/q coordinate system, and
    wherein the attenuating section at least attenuates the specific frequency component included in a q-axis current value or the control signal equivalent to the q-axis current value.

5. The electric power steering apparatus according to claim 1, wherein the specific frequency component to be attenuated increases in accordance with an increase in the rotational angular velocity of the motor.

* * * * *